(12) United States Patent
Dorr

(10) Patent No.: US 7,153,055 B1
(45) Date of Patent: Dec. 26, 2006

(54) BALL-AND-SOCKET JOINT

(75) Inventor: Christoph Dorr, Schermbeck (DE)

(73) Assignee: TRW Fahrwerksysteme GmbH & Co. KG, Dusseldorf (DE)

( * ) Notice: Subject to any disclaimer, the term of this patent is extended or adjusted under 35 U.S.C. 154(b) by 0 days.

(21) Appl. No.: 09/554,025

(22) PCT Filed: Sep. 7, 1999

(86) PCT No.: PCT/EP99/06590

§ 371 (c)(1),
(2), (4) Date: Jun. 15, 2000

(87) PCT Pub. No.: WO00/15967

PCT Pub. Date: Mar. 23, 2000

(30) Foreign Application Priority Data

Sep. 10, 1998 (DE) ................. 198 41 410

(51) Int. Cl.
*F16C 11/06* (2006.01)
(52) U.S. Cl. .............. 403/122; 403/133; 403/135; 29/898.049
(58) Field of Classification Search .......... 403/135, 403/140, 133, 122, 132; 29/898.043, 898.044
See application file for complete search history.

(56) References Cited

U.S. PATENT DOCUMENTS

| 1,824,271 | A | * | 9/1931 | Hufferd | 403/135 |
| 2,424,455 | A | * | 7/1947 | Graham et al. | 403/132 |
| 2,488,979 | A | * | 11/1949 | Kogstrom | 403/133 |
| 2,495,959 | A | * | 1/1950 | Flumerfelt | 403/138 |
| 2,556,033 | A | * | 6/1951 | Flumerfelt | 29/416 |
| 3,384,396 | A | * | 5/1968 | Hamilton | 403/126 |
| 3,530,495 | A | * | 9/1970 | Kindel | 403/140 |
| 3,574,368 | A | * | 4/1971 | Songer | 403/128 |
| 3,650,004 | A | * | 3/1972 | Bergstrom | 403/140 X |
| 4,318,627 | A | * | 3/1982 | Morin | 403/133 |

(Continued)

FOREIGN PATENT DOCUMENTS

DE  1300740  8/1969

(Continued)

OTHER PUBLICATIONS

"Automobil-Industrie" Oct. 1994, pp. 72,73 BASF Kunststoff-Technologie.

*Primary Examiner*—Daniel P. Stodola
*Assistant Examiner*—Ernesto Garcia
(74) *Attorney, Agent, or Firm*—Tarolli, Sundheim, Covell & Tummino LLP

(57) ABSTRACT

The invention relates to a ball-and-socket joint which is intended especially for vehicle chassis. The inventive ball-and-socket joint comprises a joint bolt (1) which is provided with a ball joint (1.1), and a plastic joint housing (2) into which a bearing shell (3) is introduced in order to mount the ball joint (1.1) in such a way that it can turn and so that it can tilt within certain limits. The aim of the invention is to ensure that the joint can resist considerable static and dynamic loads in the direction of the joint axis (L) without increasing the cost and to enable the ball joint to be used as a radial joint and as an axial joint. To this end, a metal ring (4) is injected into the joint housing (2). The bearing shell (3) is placed in the joint housing (2) with a positive fit using the end section (4.3) of said ring, which is radially bent inwards and which is located in the area of the opening of the joint housing (2).

2 Claims, 1 Drawing Sheet

U.S. PATENT DOCUMENTS

Figure 1:
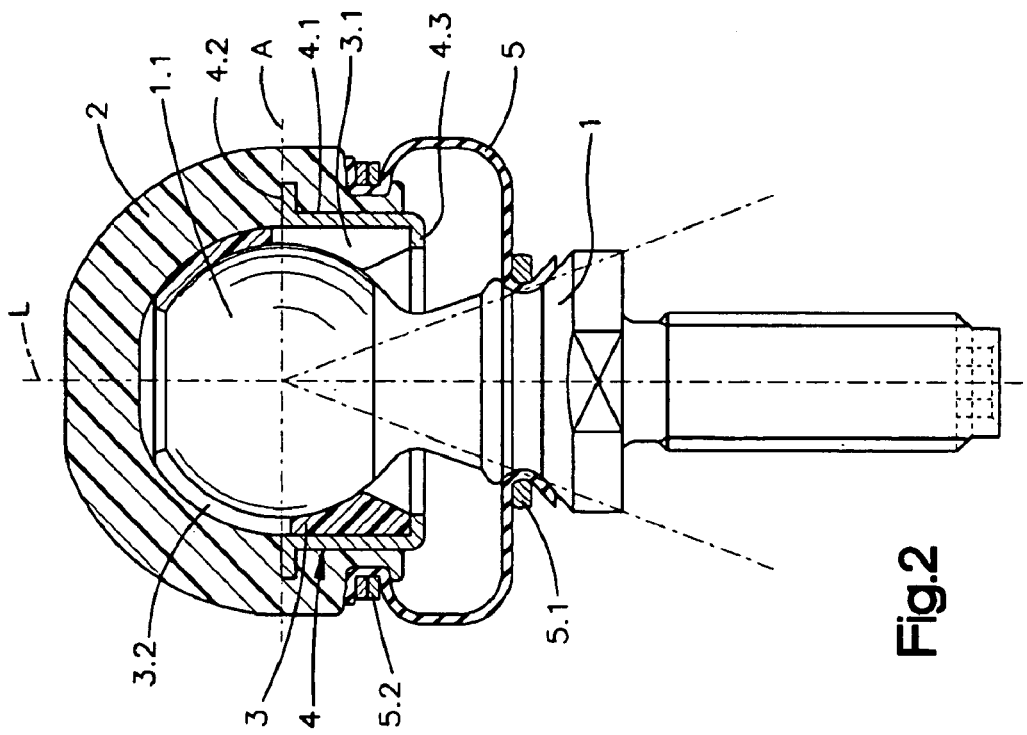

| | | | | |
|---|---|---|---|---|
| 4,482,266 A | * | 11/1984 | Kaneko | 403/135 |
| 4,722,631 A | | 2/1988 | Tagami | |
| 4,887,486 A | * | 12/1989 | Wood, Jr. | 403/141 X |
| 5,230,580 A | * | 7/1993 | Henkel | 403/135 |
| 5,395,176 A | * | 3/1995 | Zivkovic | 403/122 |
| 5,609,433 A | | 3/1997 | Pazdirek et al. | |
| 5,672,024 A | * | 9/1997 | Maughan et al. | 403/135 |
| 5,697,723 A | * | 12/1997 | Wood | 403/135 |
| 5,713,689 A | | 2/1998 | Pazdirek et al. | |
| 5,782,573 A | | 7/1998 | Dorr et al. | |
| 5,782,574 A | * | 7/1998 | Henkel | 403/135 |
| 5,794,512 A | * | 8/1998 | Prosch et al. | 403/133 |
| 5,882,137 A | * | 3/1999 | Epp et al. | 403/135 |
| 6,254,114 B1 | * | 7/2001 | Pulling et al. | 403/135 X |
| 6,955,608 B1 | * | 10/2005 | Lutz | 403/135 |
| 2004/0037621 A1 | * | 2/2004 | Suzuki et al. | 403/135 |

FOREIGN PATENT DOCUMENTS

| | | |
|---|---|---|
| DE | 4032541 | 4/1992 |
| DE | 19621722 | 12/1996 |
| DE | 19542071 | 5/1997 |
| GB | 1067426 A * | 5/1967 |
| GB | 1067426 A1 * | 5/1967 |
| GB | 126014 | 1/1972 |

* cited by examiner

BALL-AND-SOCKET JOINT

The invention relates to a ball-and-socket joint, intended particularly for motor vehicles, having a joint pin provided with a joint ball, a plastic joint housing into which is inserted a bearing shell for the rotatable, and to a limited extent tiltable, support of the joint ball, and a metal ring to positively lock the bearing shell within the joint housing.

Such ball-and-socket joints are known, for example, from DE 195 42 071 A1. The preferably plastic bearing shell inserted into the joint housing is fixed within the joint housing by a snap connection.

The object of the invention is to further develop a ball-and-socket joint of the initially described type to make it suitable, without an appreciable increase in costs, for increased static and dynamic loads in the direction of the joint axis and for use as a radial or axial joint.

This object is attained by the invention in that the metal ring is embedded within the joint housing and has a radially inwardly bent end segment located in the area of the opening in the joint housing provided for the passage of the joint pin.

This "injected" metal ring, which is embedded in the joint housing during its production, i.e., by extrusion coating during the production of the joint housing, is used on the one hand to positively lock the bearing shell within the joint housing by reshaping its end segment such that the ball-and-socket joint can support higher axial joint pin loads. On the other hand the metal ring reinforces the plastic joint housing such that a radial expansion of said joint housing upon axial loading of the joint pin is prevented, which further increases the axial loading capacity of the ball-and-socket joint according to the invention. Since the metal ring can be readily integrated in the joint housing by extrusion coating during the production of the joint housing, the aforementioned advantages compared to conventional ball-and-socket joints can be achieved without appreciable cost increases.

According to a further feature of the invention, the metal ring, on its end that is extrusion coated with the material of the joint housing, is provided with a radially outwardly angled flange to fix the metal ring securely within the joint housing. In a preferred embodiment of the invention, the flange protrudes at an approximately 90° angle from a cylindrical center part of the metal ring.

In a preferred embodiment of the invention, the inside diameter of the cylindrical center part of the metal ring approximately corresponds to the outside diameter of the bearing shell, so that the cylindrical center part of the metal ring simultaneously serves as a precise guide for the bearing shell.

To enhance the strength of the plastic joint housing, the cylindrical central part of the metal ring ends approximately in the area of the ball equator of the joint housing such that the metal ring strengthens the housing along its critical part against radial expansion.

To permit problem-free expansion of the bearing shell as the joint ball is inserted, the invention furthermore proposes to provide the bearing shell along its pin-side area with slits extending up into the area of the ball equator. A further feature of the invention proposes to provide the bearing shell along its head-side area facing away from the joint pin with indentations extending parallel to the joint axis to create flexible areas for play-free support of the joint ball. In a preferred embodiment the slits and indentations can be formed mutually offset in circumferential direction in the bearing shell.

In a preferred further development of the ball-and-socket joint according to the invention, the joint housing, in the area of its opening, is provided with a ring groove to fix the ball-side end of a sealing bellows.

Finally, the invention proposes to make the joint housing together with a chassis strut from plastic by injection molding as a single piece. This results in a particularly cost-effective production of such a component.

Figure 2:
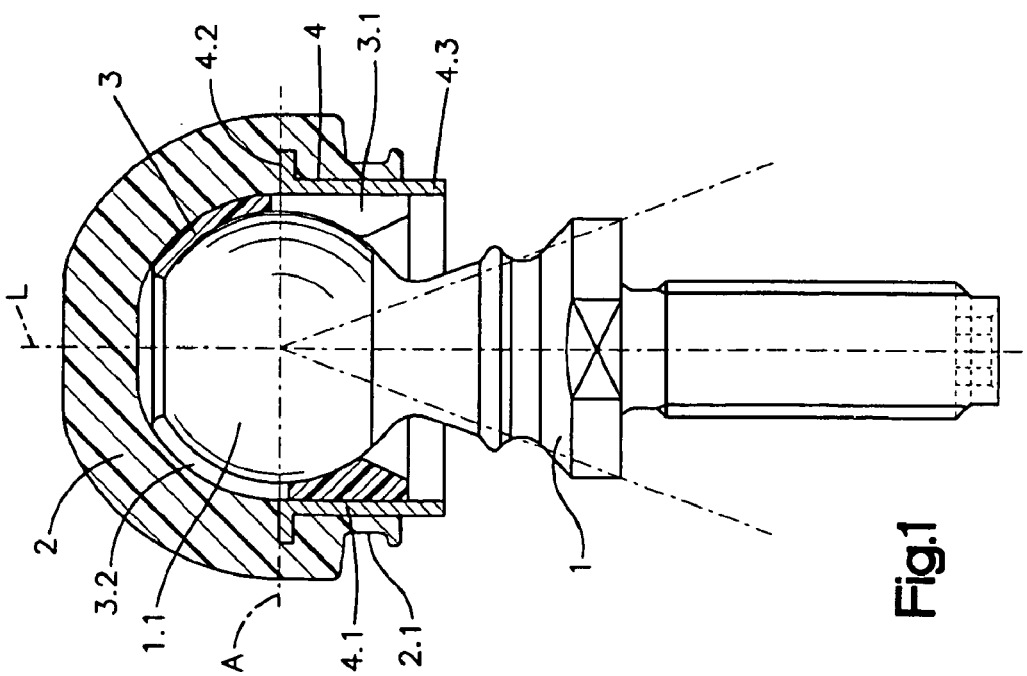

The drawing depicts an exemplary embodiment of a ball-and-socket joint according to the invention, in which:

FIG. 1 is a longitudinal section through a ball-and-socket joint during assembly and FIG. 2 is a longitudinal section corresponding to FIG. 1 through a finally assembled ball-and-socket joint.

The ball-and-socket joint intended particularly for motor vehicles and shown by way of example comprises a joint pin 1 provided with a joint ball 1.1 as well as a joint housing 2 in which joint pin 1 via its joint ball 1.1 is rotatably and to a limit extent tiltably supported by means of a bearing shell 3. Joint housing 2 and bearing shell 3 are each made of a suitable plastic.

When joint housing 2 is produced by injection molding, a metal ring 4 an exemplary embodiment of which is shown in FIGS. 1 and 2 is injected. In the examples shown, metal ring 4 comprises a cylindrical center part 4.1 extending from the opening of joint housing 2 up into the area of equator Ä of joint ball 1.1 which is in its zero position. At this end located within the area of equator Ä, a radially outwardly angled flange 4.2 is formed onto the cylindrical center part 4.1 of metal ring 4, which in the embodiment shown extends at an approximately 90° angle to the cylindrical center part 4.1. Since this flange 4.2 is enclosed by the plastic material of joint housing 2, metal ring 4 is securely anchored within joint housing 2.

With its other initially cylindrical end, metal ring 4 according to FIG. 1 protrudes from the opening of joint housing 2 provided for the passage of joint pin 1.

In the exemplary embodiment depicted in the drawing, the inside diameter of the cylindrical center part 4.1 of metal ring 4 corresponds to the outside diameter of bearing shell 3 such that metal ring 4 forms a guide for bearing shell 3.

After bearing shell 3 mounted on joint ball 1.1 has been inserted in joint housing 2, the end segment 4.3 of metal ring 4 is bent radially inwardly as shown in FIG. 2 from its initial position depicted in FIG. 1 such that metal ring 4 via its end segment 4.3 secures the position of bearing shell 3 within joint housing 2. This positively locked position of the bearing shell within joint housing 2 increases the static and dynamic loading capacity of the ball-and-socket joint in pullout direction of joint pin 1. This loading capacity of the ball-and-socket joint is further increased in that metal ring 4 injected into joint housing 2 secures joint housing 2 against expansion along the portion located between ball equator Ä and the opening.

In the example depicted in the drawing, bearing shell 3 along its pin-side area is provided with slits 3.1 extending up into the area of ball equator Ä. When bearing shell 3 is mounted on joint ball 1.1, these slits 3.1 permit an expansion of the ball-race type bearing surfaces formed by the portion of bearing shell 3 that extends between equator Ä and the opening for the joint pin.

To create flexible areas for play-free support of joint ball 1.1 in the head area of bearing shell 3, bearing shell 3 in its head-side area facing away from joint pin 1 is provided with indentations 3.2 extending parallel to joint axis L. In the depicted example, slits 3.1 and indentations 3.2 are formed mutually offset in circumferential direction in bearing shell 3.

To prevent moisture and dirt from getting into the interior of the ball-and-socket joint, a sealing bellows 5 is used, the pin-side opening of which is fixed in a ring groove of the joint pin 1 by means of a retaining ring 5.1. The ball-side opening of sealing bellows 5 is fixed by means of a retaining ring 5.2 at the end of joint housing 2 surrounding the opening. For this purpose joint housing 2 is provided with a ring groove 2.1 as shown in FIG. 1.

The metal ring (4) has a cylindrical center part (4.1) having inner and outer surfaces. The plastic joint housing (2) abuts against the outer surface of the cylindrical center part (4.1). The inner surface of the cylindrical center part (4.1) has a diameter that corresponds to an outside diameter of the bearing shell (3) and is in abutting engagement with the outside diameter of the bearing shell (3) when the bearing shell is received in the plastic joint housing (2). The metal ring (4) has a radially outwardly angled flange (4.2) that is surrounded by plastic material of the joint housing (2). The metal ring (4) has a radially inwardly bent end segment (4.3) located in an area of an opening in the joint housing (2) that is provided for passage of the joint pin (1). The radially inwardly bent end segment (4.3) secures the bearing shell (3) within the joint housing (2).

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

LIST OF REFERENCE SYMBOLS 1 joint pin
1.1 joint ball
2 joint housing
2.1 ring groove
3 bearing shell
3.1 slit
3.2 indentation
4 metal ring
4.1 center part
4.2 flange
4.3 end segment
5 sealing bellows
5.1 retaining ring
5.2 retaining ring
Ä ball equator
L longitudinal axis

The invention claimed is:

1. Ball-and-socket joint having a joint pin provided with a joint ball (1.1), a plastic joint housing (2) into which is inserted a bearing shell (3) for rotatable and tiltable support of the joint ball (1.1), and a metal ring (4) to positively lock the bearing shell (3) within the joint housing (2), the metal ring (4) is embedded in the joint housing (2) and has a radially inwardly bent end segment (4.3) located in an area of an opening in the joint housing (2) that is provided for passage of the joint pin (1), characterized in that an inside diameter of a cylindrical center part (4.1) of the metal ring (4) corresponds to an outside diameter of the bearing shell (3), the metal ring (4) having a radially outwardly angled flange (4.2) that is extrusion-coated with material of the joint housing (2).

2. Ball-and-socket joint as claimed in claim 1, characterized in that the flange (4.2) protrudes at an approximately 90° angle from the cylindrical center part (4.1) of the metal ring (4).

\* \* \* \* \*